Jan. 13, 1970   J. C. BOND   3,489,026

WORM GEAR MECHANISM

Filed Dec. 18, 1967

INVENTOR.
JOHN C. BOND
BY Evan O. Roberts
ATTORNEY.

3,489,026
WORM GEAR MECHANISM
John C. Bond, 6590 Miller, Arvada, Colo. 80002
Filed Dec. 18, 1967, Ser. No. 691,627
Int. Cl. F16h *1/16, 55/00*
U.S. Cl. 74—425                                                         4 Claims

ABSTRACT OF THE DISCLOSURE

A worm gear mechanism provides a structure having a worm and an internal worm gear in mesh through a series of balls positioned in grooves in the worm and worm gear, and with the balls circulated in series during operation of the mechanism.

SUMMARY OF THE INVENTION

This invention relates to a worm gear mechanism wherein an output gear is rotatably mounted in a housing and is provided with internal grooves to provide a ring gear drive surface. The housing is provided with a portion which extends into the ring gear and rotatably supports a worm with a groove and a surface therearound which are adjacent and complemental with adjacent grooves in a general internal surface of the ring gear. The worm is in driving engagement with the worm ring gear by balls positioned in the worm and worm ring gear grooves. The worm is also provided with a longitudinal passage interconnecting the ends of the groove thereon so that the balls are circulated in series during operation of the mechanism, and means is provided for driving the worm gear within the ring gear. A worm gear mechanism is thus provided which has an internal worm and thereby utilizes less space than known types of ball worm gear mechanisms. Also, although the worm hereof can be generally cylindrical, the novel structures hereof provide a fully double enveloping worm and worm gear arrangement as is illustrated. In fact, the structure illustrated provides a minimum of two full ball groove engagements as an example of a double enveloping structure transmitting power.

Figure 1:
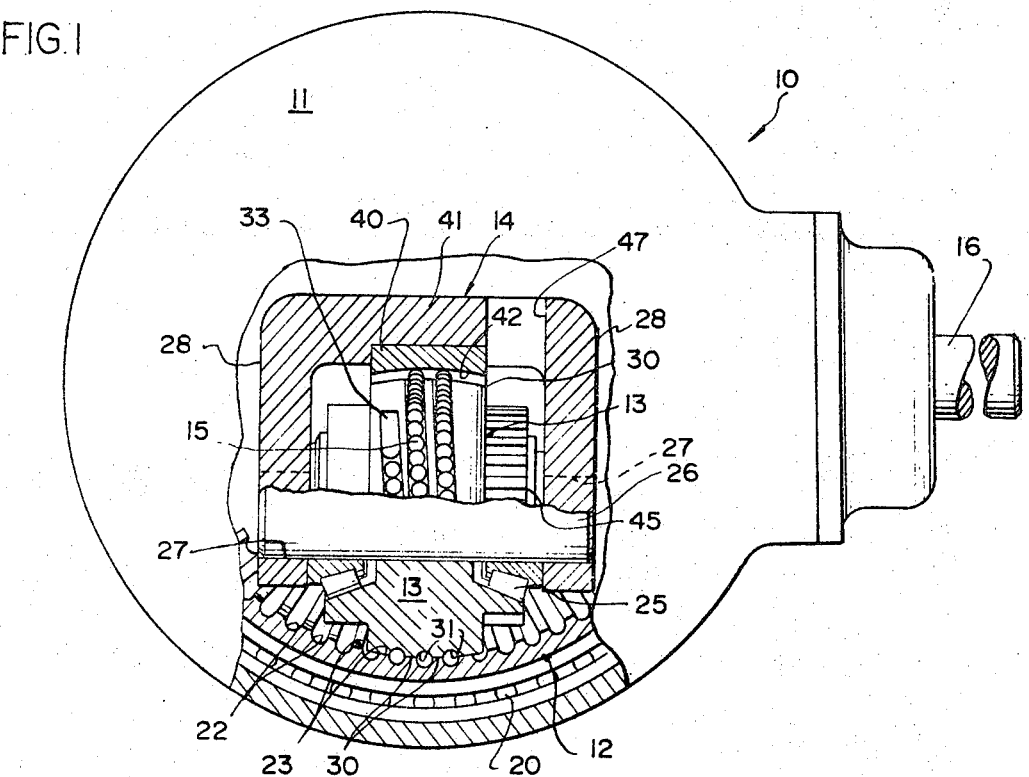
Figure 2:
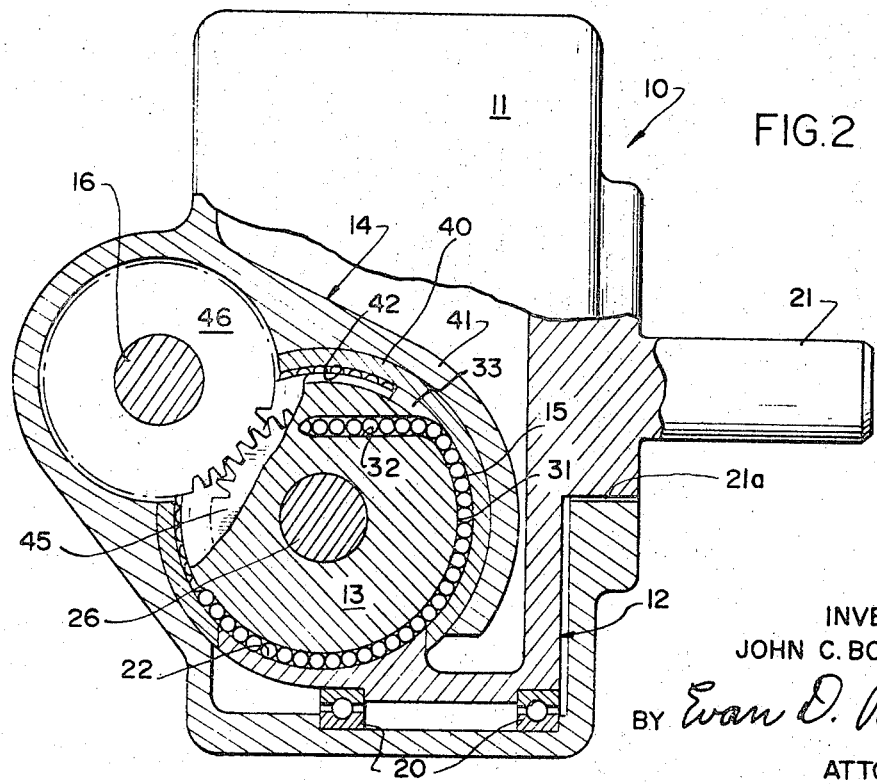

Other advantages and novel aspects of the invention will become apparent upon examination of the following detailed description in conjunction with the accompanying drawing wherein:

FIG. 1 is a partially sectioned view of the worm gear mechanism of this invention showing interrelationship of the elements thereof; and FIG. 2 is a partially sectioned side view of the worm gear mechanism of this invention showing the intermeshing drive relationship and circulation path of the balls with respect to the worm and ring gears.

A worm gear mechanism generally represented by the numeral 10 is shown in FIGS. 1 and 2 for the purpose of illustrating and describing this invention. The worm gear mechanism 10 includes, among other things, a housing 11, a driven output worm ring gear 12, a worm gear 13, a worm support mount 14, a series of drive balls 15, and a drive input shaft 16.

The worm ring gear 12 as developed by this invention is an internal worm gear rotatably mounted on bearings 20 in the housing 11 and has an output driven shaft 21 extending through an aperture 21a in the housing 11. The ring gear 12 is provided with a series of radially arcuate and generally helical grooves 22 extending laterally thereacross to provide a general internal drive transmitting surface 23. The worm gear 13 is rotatably mounted on bearings 25 supported on a worm support shaft 26 contained in apertures 27 in sides 28 of the worm housing mount extension 14. The worm 13 is provided with a longitudinally arcuate surface 30 (FIG. 1) having a circular cross section substantially complemental with the inner drive surface 23 of the ring gear 12, and is provided with a helical groove 31.

The series of balls 15 are positioned in the helical groove 31 in the worm, as well as in the adjacent grooves 22 of the ring gear 12 to provide a double enveloping ball drive relationship therebetween. A longitudinal ball return passage 32 (FIG. 2) is provided in the worm 13 substantially longitudinal therealong and interconnects the ends of the groove 31 of the worm 13 so that the balls 15 can circulate with respect to the worm 13 and ring gear 12 during driving operation therebetween. A ball pick-up guide 33 is provided to receive the balls 15 from the worm groove 31 and guide same into the longitudinal ball return passage 32 to the other end of the worm groove 31.

A ball retainer housing 40 is positioned within the central portion 41 of the worm mount 14 and is provided with a race surface 42 adjacent the balls 15 in the worm 13 except where the ring gear grooves 22 are in contact with the balls 15 so that the balls will be confined to the grooves 31 when not in engagement between the ring gear 12 and the worm 13. A spur gear 45 is provided concentrically on the worm 13, and is in mesh with a drive spur gear 46 mounted on the drive input shaft 16, and is positioned in a slot 47 in the central portion 41 of the worm mount 14.

In operation, the drive input shaft 16 is driven counterclockwise (FIG. 2) so that the input gear 46 will drive the worm drive gear 45 clockwise. Inasmuch as the worm 13 is secured to the worm drive gear 45, the worm will drive the internal worm ring gear 12 counterclockwise (FIG. 1) through the driving relationship created by the series of balls 15 positioned in the ring gear grooves 22 and worm gear groove 31. As the worm 13 is rotated clockwise, the series of balls 15 will be urged counterclockwise with respect thereto as a result of friction whereby the balls 15 will be caused to engage the ball pick-up guide 33 and direct the balls into the ball return passage 32 (FIG. 2) to the right end (FIG. 1) of the worm groove 31 to be recirculated between the worm 13 and the worm ring gear 12 in drive transmitting relationship therebetween. The counterclockwise rotation of the worm ring gear 12 will drive the output shaft 21.

It is to be understood that the invention is not to be limited to the specific constructions and arrangements shown and described, as it will be understood to those skilled in the art that certain changes may be made without departing from the principles of the invention.

What is claimed is:

1. An antifriction worm and gear mechanism comprising a housing, an output shaft rotatably mounted in said housing, a ring gear in said housing concentrically secured to said output shaft to rotate therewith, said ring gear having a series of lateral radially arcuate grooves thereacross to form internal force transmitting surfaces, a worm mount extending from said housing and within said ring gear, a worm rotatably mounted in said worm mount on an axis within said ring gear, said worm having a groove extending around the surface thereof and complementally arcuately adjacent the grooves in said ring gear in doubly enveloped axial and circumferential relationship by said worm gear, a ball passage in said worm for connecting the ends of said worm groove, a series of balls positioned in said worm groove and worm passage and in driving relation with said ring gear within the adjacent grooves thereof, a ball retainer secured to said housing extension adjacent said worm and adapted to retain the balls in the groove thereof, and means for rotating said worm to drive said output shaft through said balls and ring gear with said balls circulating in seires in the worm and ring gear grooves and worm passage.

2. An antifriction worm and gear mechanism as defined in claim 1 wherein said ring gear grooves are radially arcuate helical grooves.

3. An antifriction worm gear mechanism as defined in claim 2 wherein said worm is positioned in a chordal plane of said ring gear within said ring gear and has the passage therein extending substantially longitudinally therethrough.

4. An antifriction worm and gear mechanism as defined in claim 1 wherein said worm rotating means comprises an input shaft rotatably mounted in said housing outside of said ring gear and is drivingly connected with said worm.

References Cited

UNITED STATES PATENTS

| 2,455,487 | 12/1948 | Hoffar | 74—458 |
| 2,505,435 | 4/1950 | Schmidt | 74—425 X |
| 3,365,974 | 1/1968 | Lieberman | 74—425 |

FOREIGN PATENTS

| 1,364,301 | 5/1964 | France. |
| 513,833 | 1939 | Great Britain. |

LEONARD H. GERIN, Primary Examiner

U.S. Cl. X.R.

74—464

UNITED STATES PATENT OFFICE
CERTIFICATE OF CORRECTION

Patent No. 3,489,026                          January 13, 1970

John C. Bond

It is certified that error appears in the above identified patent and that said Letters Patent are hereby corrected as shown below:

In the heading to the printed specification, line 3, "John C. Bond, 6590 Miller, Arvada, Colo. 80002" should read -- John C. Bond, Arvada Colo., assignor, by mesne assignments, to Borg-Warner Corporation, Chicago, Ill., a corporation of Delaware --.

Signed and sealed this 10th day of November 1970.

(SEAL)
Attest:

Edward M. Fletcher, Jr.                      WILLIAM E. SCHUYLER, JR.
Attesting Officer                                Commissioner of Patents